US012502860B2

(12) United States Patent
Ebrecht

(10) Patent No.: US 12,502,860 B2
(45) Date of Patent: Dec. 23, 2025

(54) ADAPTIVE BRIDGE AND TRUCK ASSEMBLIES FOR ROTARY DEVICE

(71) Applicant: MAXCESS INTERNATIONAL CORPORATION, Oak Brook, IL (US)

(72) Inventor: Scott R. Ebrecht, Eureka, MO (US)

(73) Assignee: MAXCESS INTERNATIONAL CORPORATION, Oak Brook, IL (US)

( * ) Notice: Subject to any disclaimer, the term of this patent is extended or adjusted under 35 U.S.C. 154(b) by 373 days.

(21) Appl. No.: 18/456,739

(22) Filed: Aug. 28, 2023

(65) Prior Publication Data

US 2025/0074024 A1 Mar. 6, 2025

(51) Int. Cl.

| | |
|---|---|
| ***B30B 15/00*** | (2006.01) |
| ***B30B 3/04*** | (2006.01) |
| ***B30B 15/04*** | (2006.01) |
| ***B30B 15/30*** | (2006.01) |

(52) U.S. Cl.

CPC .......... *B30B 15/007* (2013.01); *B30B 15/308* (2013.01)

(58) Field of Classification Search

CPC ..... B30B 15/007; B30B 15/308; B30B 15/04; B30B 3/04; B30B 3/00; B30B 3/005; B21B 29/00; B21B 31/16; B21B 31/203; B21B 31/24

See application file for complete search history.

(56) References Cited

U.S. PATENT DOCUMENTS 3,985,488 A * 10/1976 Hoffmann ............... B29C 43/24 425/363
5,279,139 A * 1/1994 Sturm ..................... B21B 31/16 72/13.4
5,388,490 A * 2/1995 Buck .................... B26D 7/2628 83/887
5,924,319 A * 7/1999 Ginzburg ................ B21B 29/00 72/247

* cited by examiner

*Primary Examiner* — Mohammed S. Alawadi

(74) *Attorney, Agent, or Firm* — McNees Wallace & Nurick LLC

(57) ABSTRACT

A rotary device including a bridge attached to a frame of the rotary device, and a truck disposed adjacent to the bridge and configured to support at least two block assemblies thereof, wherein the at least two block assemblies are configured to be moveable with respect to each other. The truck includes a shaft such that the at least two block assemblies slide on the shaft and locks in place at different locations along the shaft, wherein a downward force is applied against a top portion of the at least two block assemblies to apply pressure against a topmost roller of the plurality of rollers.

20 Claims, 16 Drawing Sheets

ADAPTIVE BRIDGE AND TRUCK ASSEMBLIES FOR ROTARY DEVICE

FIELD OF DISCLOSURE

The present disclosure is directed to a bridge and truck assemblies for a rotary device. More specifically, the present disclosure is directed to an adaptive or adjustable bridge and truck assemblies for a press die station.

BACKGROUND

Conventional bridges and trucks in a rotary converting industry are typically manufactured to apply a downward force in two fixed locations over the rotary die's bearers. In order to apply the downward force in varying locations in the press die station, it requires some form of variation(s) in the conventional bridge and truck design. For instance, one variation in the conventional bridge design can be forming a milled slot thereof and employing a slider in the slot to allow the operator to slide a jack screw to a desired location. However, in this configuration, the slot and slider must be loose-fitting causing vibration and noise, and/or additionally, significantly reducing the bridge stiffness. As for regards to variation of the truck design, this requires some sort of sliding bearing block with a set screw to hold the block in place, requiring a tool for adjustments. When the sliding mechanism is a slot in a plate of the truck, this weakens the truck due to the presence of the slot. Moreover, most conventional bridge and truck designs require a tool(s) (e.g., hex key type wrench) for adjustment while adapting and setting up the press between jobs. However, this introduces a potential for tools to drop down into the press. In many cases, it will be difficult for the operator to get down into the press to find the missing tool. Furthermore, in this situation, the operator may unknowingly start the press which can cause damage to the rotary device, the web or even the press drive system should the tool get caught between the rotating assemblies. Moreover, operators typically use mechanical bridge clamps to put pressure on die and anvil rollers, which is a manual process, and operators have to repeat the pressure set-up (by feel) with every changeover.

Therefore, there is a need in the art for a bridge and truck assemblies that do not suffer from the above shortcomings.

SUMMARY

In an example embodiment, a rotary device is disclosed which includes a bridge attached to a frame of the rotary device, and a truck disposed adjacent to the bridge and configured to support at least two block assemblies thereof, wherein the at least two block assemblies are configured to be moveable with respect to each other. The truck includes a shaft such that the at least two block assemblies slide on the shaft and locks in place at different locations along the shaft, wherein a downward force is applied against a top portion of the at least two block assemblies to apply pressure against a topmost roller of the plurality of rollers.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF EXAMPLE EMBODIMENTS

The present disclosure provides an adaptive (or adjustable) bridge and truck assemblies that are designed to allow an operator to apply downward force anywhere across a full width of a press without the need to use any additional tools, such as, for example, a hex key type wrench. As such, repeatable and accurate results of the downward force over the press are achieved, i.e., uniform and repeatable pressure across the roller. In addition, the pressing operation is less prone to human error and reduces downtime/costs associated with setup, improves safety by reducing operators from working inside of the press machines, eliminates rotary damage, extends rotary life, produces higher quality and consistent product, and/or increases throughput by eliminating stoppages to address the aforementioned problems. As such, this enables the operator to simplify die pressure setup including setting up quicker between press operations, i.e., makes the press change-over quicker and simpler by offering adjustments and controls that are quick, simple, ergonomic, and tool-free.

Some specific features associated with the present truck and bridge assemblies include, for example, but not limited to:

- a (rounded) shaft of the truck provides stiffness and a linear sliding rail as a single component;
- spring-loaded brake leaves of tandem blocks of the truck provide simple, tool-free adjustment and locking functions;
- oil cup and tube assemblies of the truck deliver lubricant exactly where it's needed;
- (rounded) two shafts of the bridge provide the strength and linear sliding rails in one pair of parts;
- spring-loaded brake leaves of blocks of the bridge provide simple, tool-free adjustment and locking functions; and/or
- a magnetic locking pin assembly of the bridge provides a unique, tool-less locking mechanism to fasten the bridge to a frame of a press.

Figure 1:
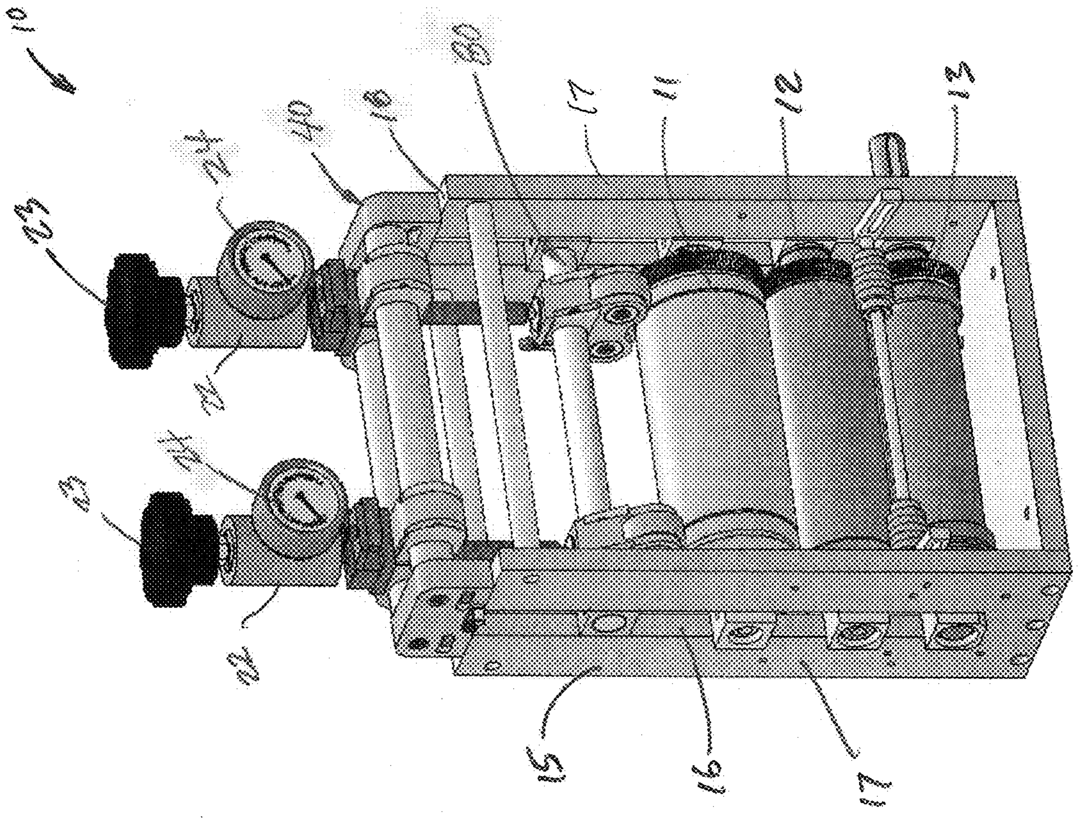
FIG. 1 is a perspective view of an exemplary rotary system, according to an example embodiment of the present disclosure.

FIG. 1 shows an exemplary rotary system 10 including a plurality of rollers (or dies) 11, 12, 13 in a die station for handling web products. Each of the plurality of rollers 11, 12, 13 at end portions thereof are supported and fixed in a frame 15 of the rotary system 10. In some implementations, the frame 15 can be designed as a flush side frame mounting member so as to directly mount to a side frame of a machine in which no additional cut outs are required for mounting. In other implementations, the frame 15 can be a stand-alone machine where it can be mounted in a press or fastened through a floor of a die station.

Figure 2:
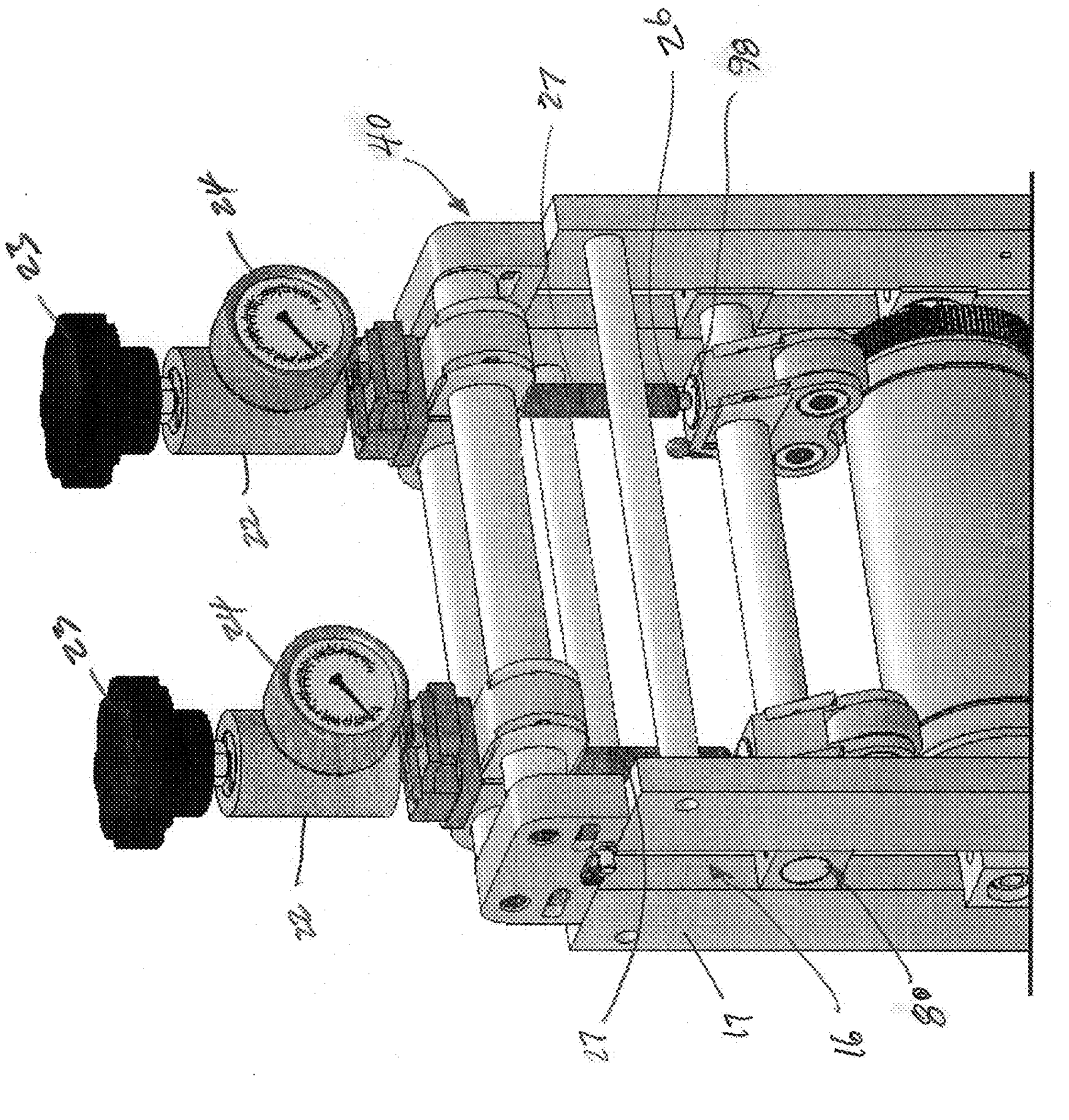
FIG. 2 is a perspective partial view of an exemplary rotary device, according to an example embodiment of the present disclosure.
Figure 3:
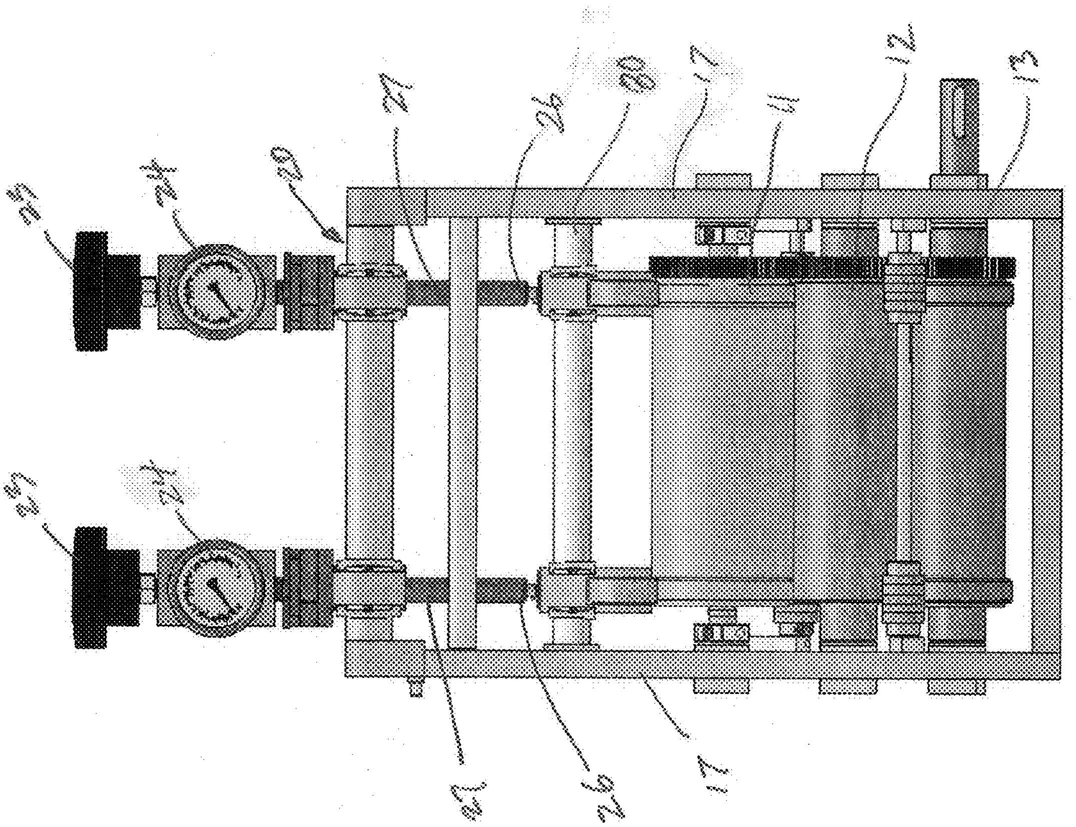
FIG. 3 is a perspective front view of an exemplary rotary device, according to an example embodiment of the present disclosure.

As shown, each end portion of rollers 11, 12, 13 (via shafts) is placed in an opening 16 at each side portion 17 of the frame 15 and secured in place. At a top portion 18 of the frame 15, a bridge 40 is attached to the frame 15 thereof. It should be appreciated that the bridge 40 can be removed from the frame 15 for quick die pressure set up changeover or maintenance. The bridge 40 is configured to hold and secure two hydrajacks 22 (manufactured by RotoMetrics) for applying pressure to the rollers 11, 12, 13. More specifically, the hydrajacks 22 apply pressure directly to (top) roller 11. The hydrajacks 22 allow press operators to easily monitor die cutting force, and as a result, decrease downtime and increase the operating life of the die. Further, the hydrajacks 22 include an adjustable handle 23 for adjusting the pressure and a pressure gauge 24 to measure and monitor the applied pressure. In one implementation, the hydrajacks 22 are calibrated in pounds of force to certified national standards. For example, hydrajacks 22 can produce pressures of approximately 500 psi to 3000 psi. It should be appreciated that the hydrajacks 22 can be sized so that 1 psi pressure equals 1 pound of downward force. As shown in FIG. 3, each end 26 of hydrajacks 22, more specifically, a jacking screw 27 contacts a portion of a truck 80. In one implementation, the jacking screw 27 directly contacts a contact pad 98 formed on a top portion of the truck 80 (FIG. 2). In one implementation, the contact pad 98 can be made from a metal material, such as, but not limited to, stainless steel.

Figure 4:
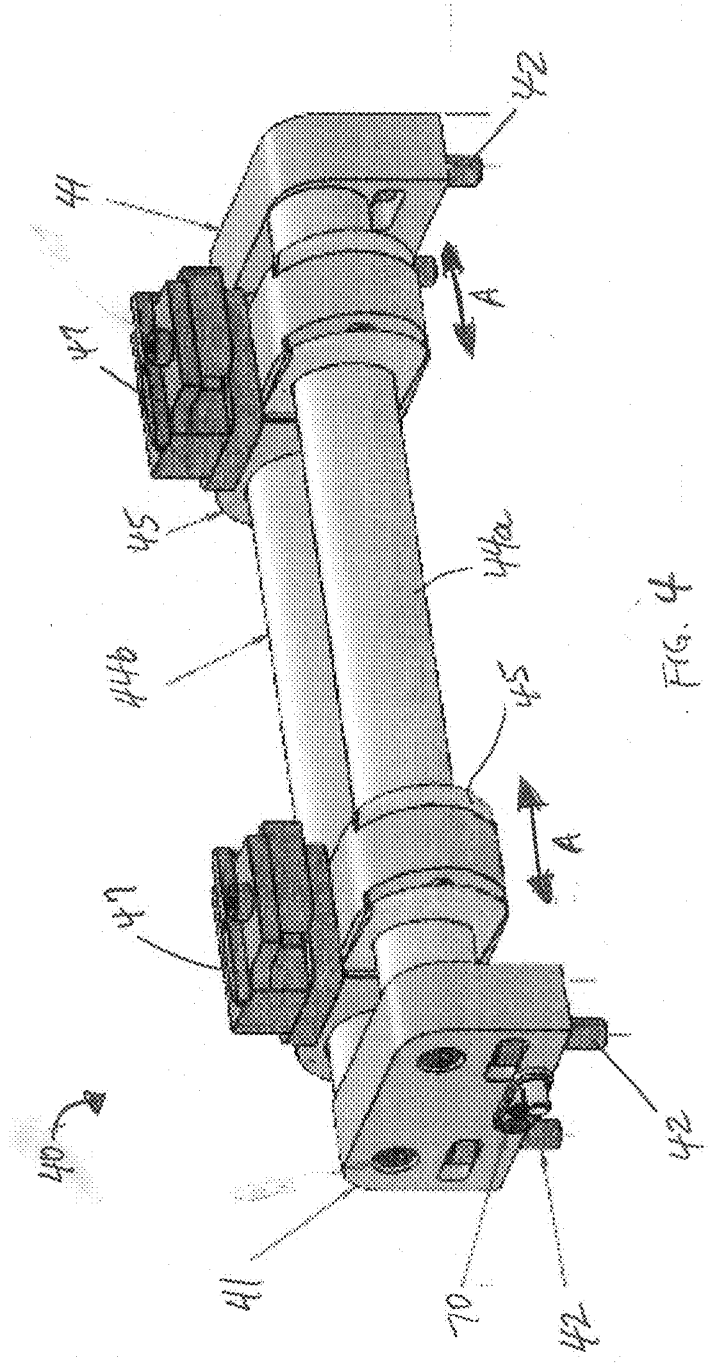
FIG. 4 is a perspective view of an exemplary bridge, according to an example embodiment of the present disclosure.

Referring now to FIG. 4, the bridge 40 includes an end block 41 disposed at each end thereof. Each end block 41 includes openings for receiving shoulder screws 42, which are shoulder bolts that extend vertically from the top portion 18 of the frame 15. The frame 15 includes threaded holes in which the shoulder screws 42 are fastened thereto. In one implementation, each end block 41 contains a pair of shoulder screws 42 corresponding to the same number of shoulder bolts in the frame 15. It should be appreciated that there can be more than two shoulder screws 42. As will be described in detail later, the bridge 40 is 'adaptive' with respect to the frame 15 in that the bridge 40 can slide over the shoulder bolts in the frame 15 to be released and locked in place. As such, this enables the bridge 40 to be quickly replaced or adjusted without any tools.

The bridge 40 further includes two slide block assemblies 45 that can move (i.e., translate, slide) (as shown by arrows A) along two round shafts **44*a*, 44*b*, which are attached between each end block 41. In some implementations, the two slide block assemblies 45 can move towards each other or the two slide block assemblies 45 can move away from each other. The movement of the two slide block assemblies 45 works in conjunction with the truck 80. That is, the translational movements allow for the two slide block assemblies 45 to be directly above the truck 80 for applying pressure via the hydrajacks 22. This enables a precise and accurate displacement of the slide block assemblies 45. On top of each slide block assembly 45 includes a support 47 for supporting the jacking screw 27 of the hydrajack 22. In an example embodiment, the support 47 includes a cam lock assembly 51 and a cam lock adapter plate 52 (FIG. 5) made as an all-steel assembly. The cam lock assembly 51 and the cam lock adapter plate 52 can be fastened together using fasteners, such as, for example, screws, bolts, anchors, rivets, etc. In other implementations, the cam lock assembly 51 and the cam lock adapter plate 52** can be made as a single part unit.

Figure 5:
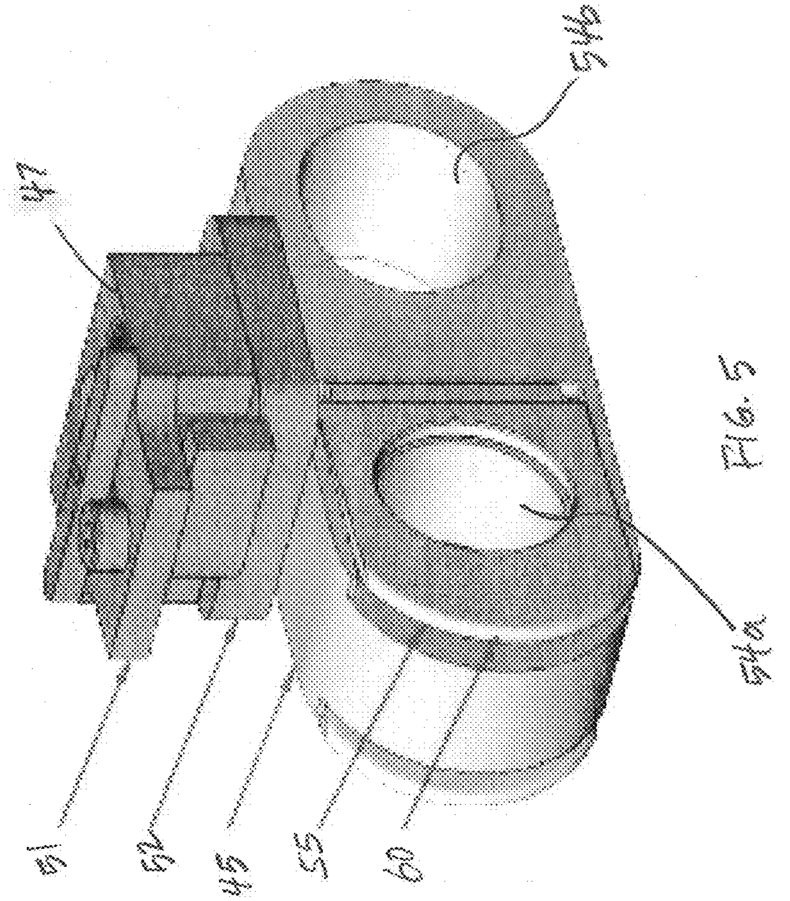
FIG. 5 is a perspective view of an exemplary block assembly of a bridge, according to an example embodiment of the present disclosure.

As shown in FIG. 5, the slide block assembly 45 includes two openings **54*a*, 54*b*, each opening corresponding to the shape of the two shafts 44*a*, 44*b*. That is, opening 54*a* slides on shaft 44*a* and opening 54*b* slides on shaft 44*b*. In some implementations, opening 54*a* has a substantially circular shape and opening 54*b* has a substantially oval shape. The different shapes of the shafts 44*a*. 44*b* provide greater strength and ensure proper linear movement of the slide block assemblies 45 along the respective shafts 44*a*, 44*b*. It is appreciated that other shapes may be employed besides the shapes described herein. Alternatively, it can be appreciated that the shapes of the shafts 44*a*, 44*b* (including the openings 54*a*, 54*b***) can be of the same shape.

Figure 6:
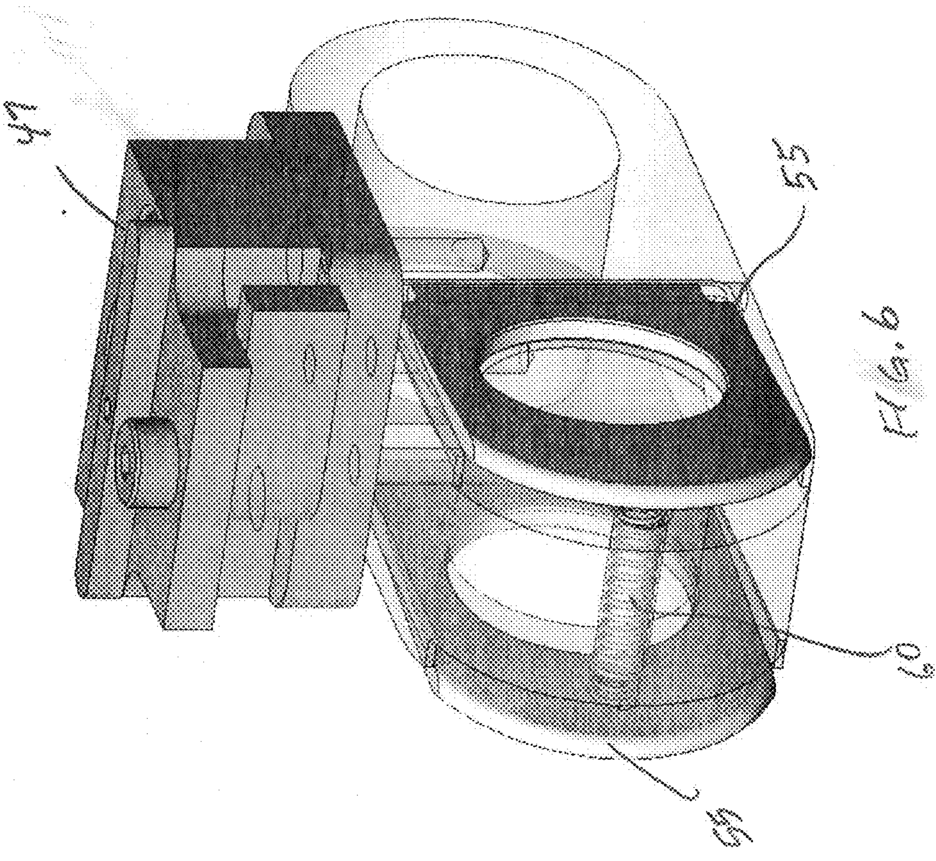
FIG. 6 is a perspective partial view of an exemplary block assembly of a bridge, according to an example embodiment of the present disclosure.
Figure 7A:
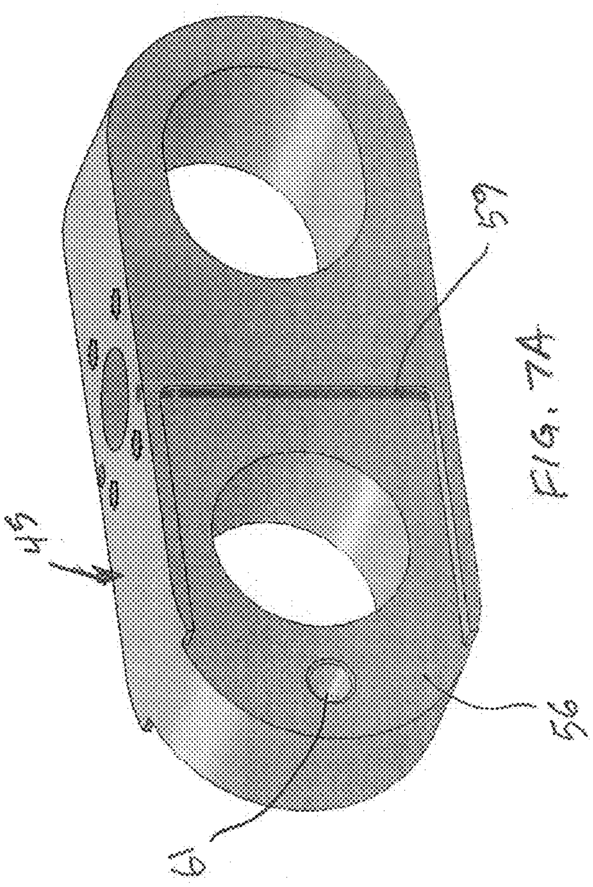
FIG. 7A is perspective view of an exemplary partial block assembly, according to an example embodiment of the present disclosure.
Figure 7B:
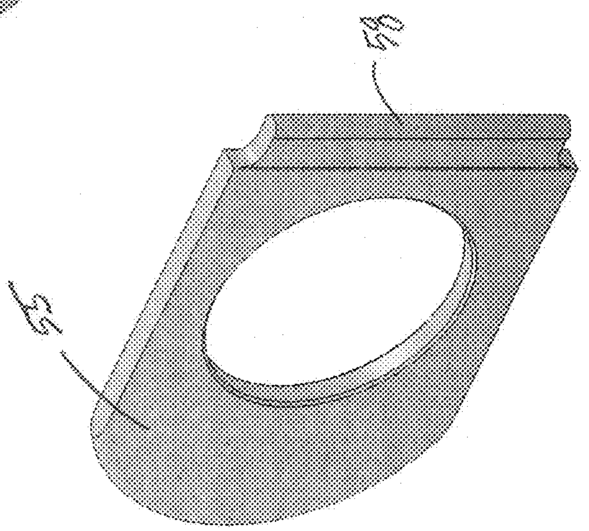
FIG. 7B is an exemplary brake leaf of a block assembly, according to an example embodiment of the present disclosure.

Referring now to FIGS. 6 and 7A-7B, in order to lock and release the slide block assembly 45 from the shafts **44*a*, 44*b*, the slide block assembly 45 includes a spring-loaded brake leaf 55 at each side portion 56 of the slide block assembly 45. One end 58 of the spring-loaded brake leaf 55 is attached (or inserted into) to a slot portion 59 of the slide block assembly 45. In one implementation, end 58 is rounded or curved that is designed to intermate or engage with the slot portion 59 of the slide block assembly 45. In other words, the brake leaf 55 can pivot about the rounded end 58 while being engaged inside the slot portion 59, in which the slot portion 59 is curved surface machined into the side portion 56 of the slide block assembly 45. Due to the shape and interaction of the rounded end 58 against the slot portion 59, the brake leaf 55 can be wedged which prevents from any movement until it is released. As shown in FIG. 6, a coil spring 60 is attached to the brake leaves 55 at each end thereof and extends through an opening 61 formed in a body of the slide block assembly 45 (FIG. 7A). The coil spring 60 provides the resistance force to lock the brake leaves 55 in their place. In other words, a tension of the coil spring 60 provides an outward force that allows the brake leaves 55 to be fixed in its place. In order to release the brake leaves 55, the operator moves the brake leaves 55 toward each other (i.e., squeezes the brake leaves 55 together) causing the slide block assembly 45 to unlock and freely move or slide along the shafts 44***a*, 44*b*. Once the desired location is set, the operator then releases both brake leaves 55 and locks the slide block assembly 45 against the shafts 44*a*, 44*b*. This enables easy, quick adjustability of the block assemblies 45 without any tools or additional procedures.

Figure 8A:
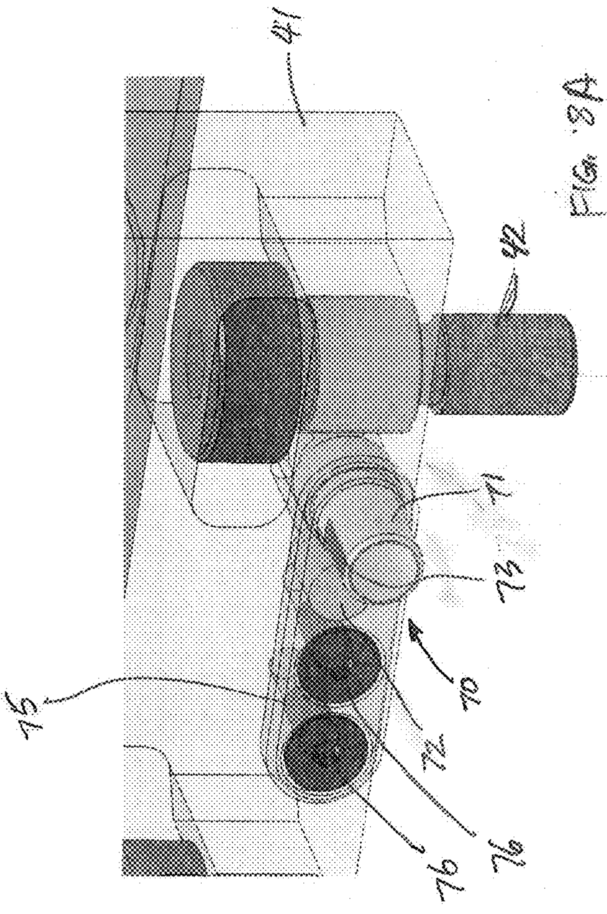
FIG. 8A is a perspective partial view of a lock pin assembly in a locked position, according to an example embodiment of the present disclosure.
Figure 8B:
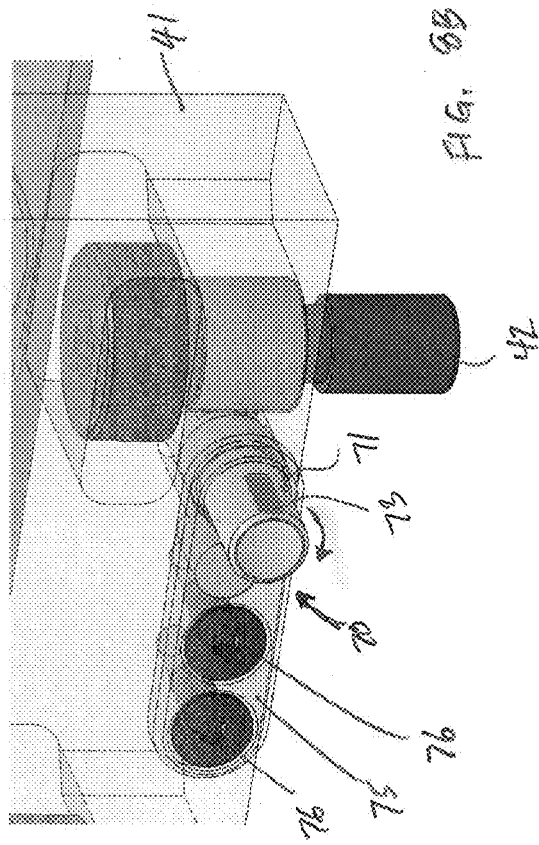
FIG. 8B is a perspective partial view of a lock pin assembly in a released position, according to an example embodiment of the present disclosure.

Referring now to FIGS. 8A and 8B, each end block 41 of the slide block assembly 45 includes a lock pin assembly 70 that is configured to lock the bridge 40 against the top portion 18 of frame 15. As shown, the lock pin assembly 70 is attached on a platform 75, made of metal (e.g., steel), to support the lock pin assembly 70 against the end block 41. The platform 75 is attached to a side portion of the end block 41 using fasteners 76, for example, but not limited to, a set screw.

In some implementations, the lock pin assembly 70 includes a lock pin 71 and a lock pin magnet 72 that cooperatively engage with each other. For example, a portion of the lock pin 71, (e.g., an outer circumference) can be made from a magnetic material which acts with the lock pin magnet 72. In one implementation, the lock pin 71 and the lock pin magnet 72 can be neodymium magnets acting as permanent magnets. By way of example, when the lock pin 71 is rotated (i.e., ¼ of a turn), as shown in FIG. 8B, this causes the end block 41 of the bridge 40 to move or slide over the shoulder bolts of the frame 15, and when the lock pin 71 is released, this causes the end block 41 to be locked in place, as shown in FIG. 8A. To describe in a different manner, due to the magnetic effects of the lock pin 71 and the lock pin magnet 72 (e.g., a resisting torque when rotated), the lock pin 71 attempts to continually return to its original position of FIG. 8A. As such, this enables a toolless, ergonomic and unique technique of attaching the bridge 40 to the frame 15 of the press. In some implementations, the lock pin 71 may include a marking 73 to help identify the position of the lock pin 71 when rotated. For example, the marking 73 can be an indentation or depression formed at an outer surface of the lock pin 71.

Figure 9A:
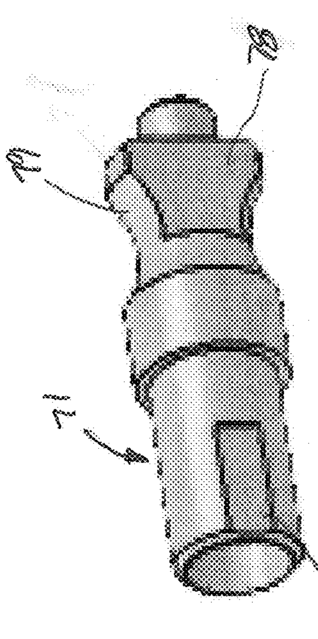
FIG. 9A is a perspective view of a lock pin, according to an example embodiment of the present disclosure.
Figure 9B:
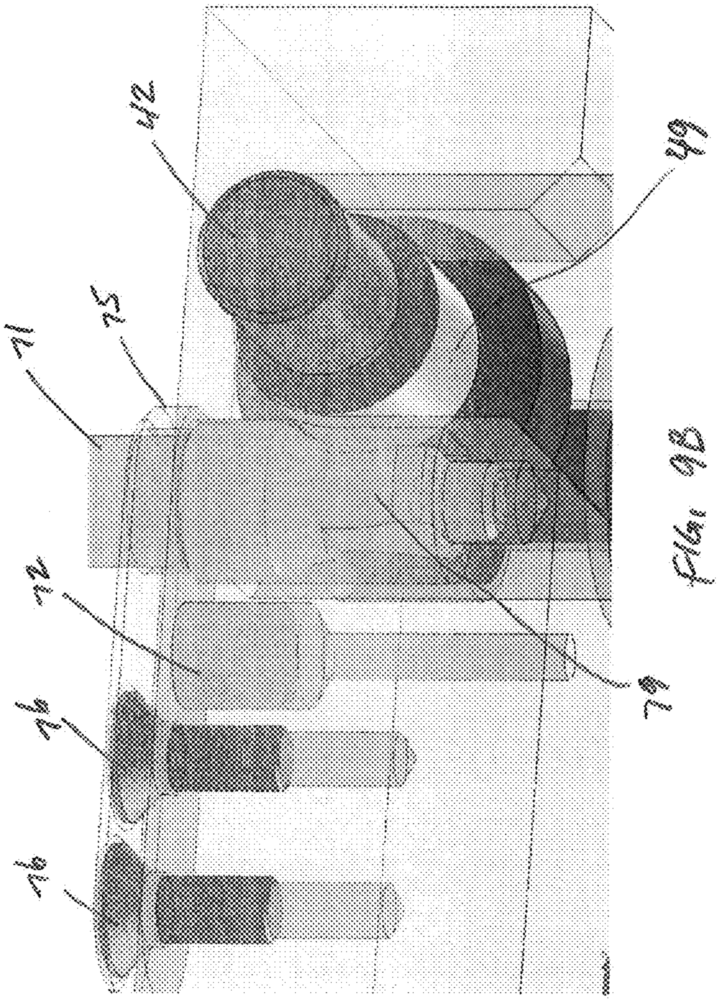
FIG. 9B is a perspective partial view of a lock pin assembly in a released position, according to an example embodiment of the present disclosure.
Figure 9C:
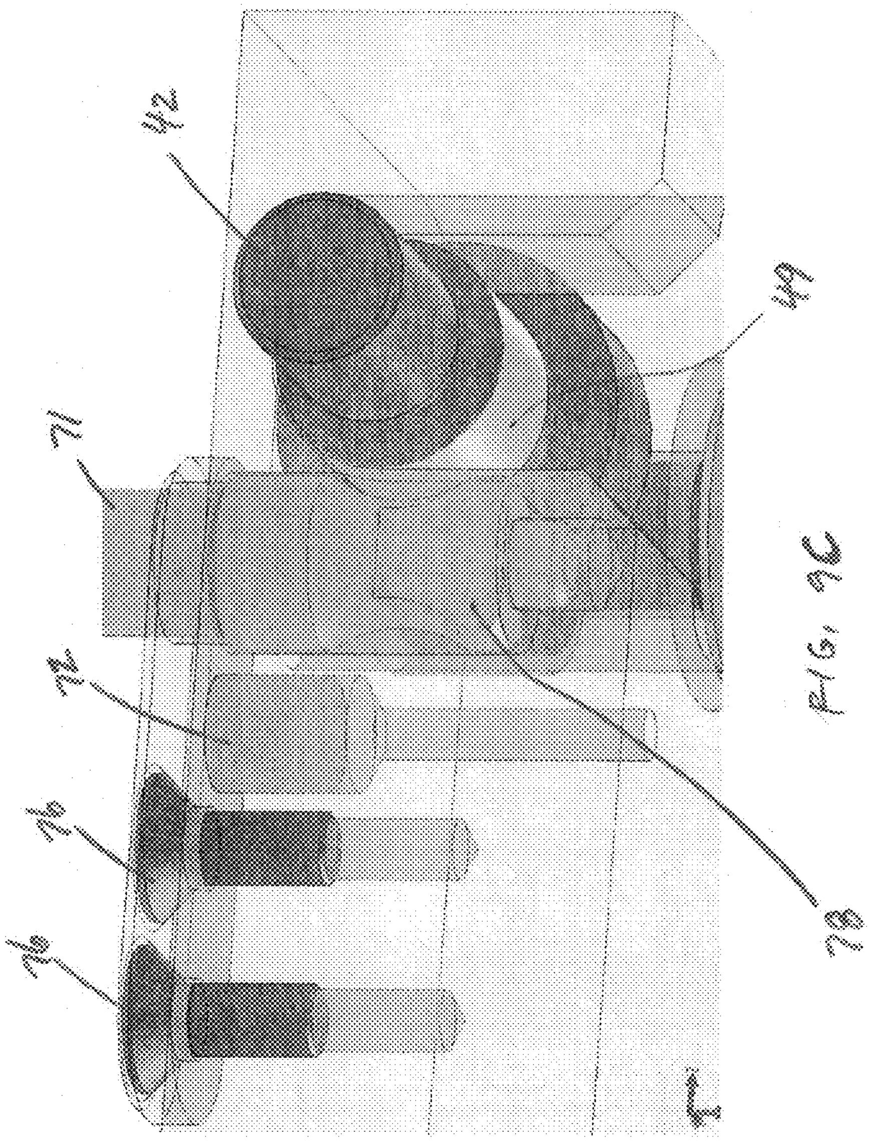
FIG. 9C is a perspective partial view of a lock pin assembly in a locked position, according to an example embodiment of the present disclosure.

As shown in FIG. 9A, one end of the lock pin 71 includes a flat portion 78 and a curved portion 79 that engages a circular stem 49 (positioned inside of the end block 41) of shoulder screw 42. It should be understood that the flat portion 78 and the curved portion 79 are rotatably engageable with the circular stem 49 when the lock pin 71 is rotated. For example, when the flat portion 78 engages the circular stem 49 (as shown in FIG. 9B), this indicates that the lock pin 71 is at its released position, and when the curved portion 79 engages the circular stem 49 (as shown in FIG. 9C), this indicates that the lock pin 71 is at its locked position. Due to the shape of the curved portion 79, this pushes (or slides) the bridge 40 over the shoulder bolts of the frame 15.

Figure 10:
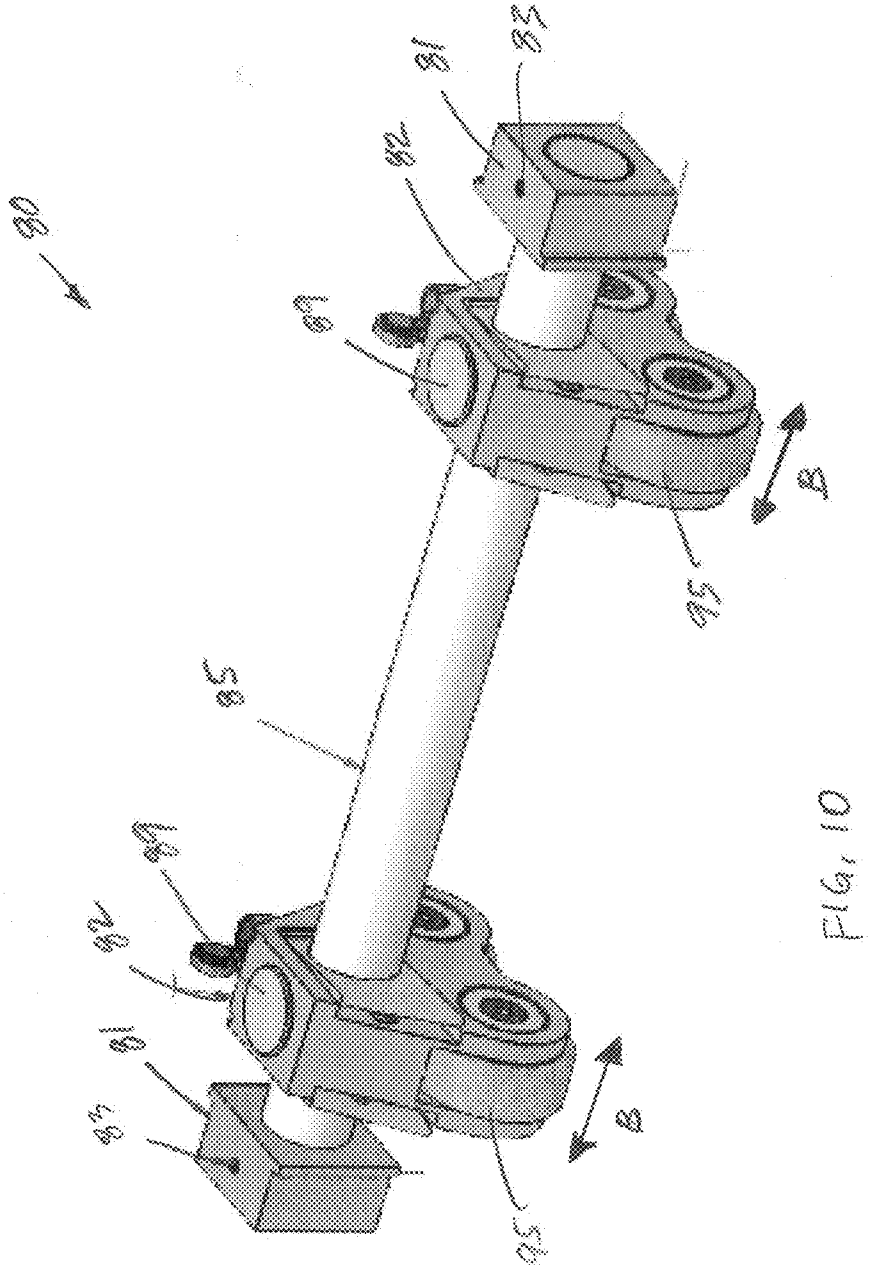
FIG. 10 is a perspective view of an exemplary truck, according to an example embodiment of the present disclosure.

Referring now to FIG. 10, truck 80 is shown. The truck 80 can be attached to the frame 15 below the bridge 40 and above the plurality of rollers 11, 12, 13. The truck 80 is configured to apply direct pressure to the top roller 11 generated by the hydrajacks 22. In one implementation, the truck 80 includes ball bearings 95 that directly contacts roller 11.

In some implementations, the truck 80 includes an end block 81 disposed at each end of the truck 80. The end blocks 81 are configured to be inserted into and held in the slot 16 of the side portion 17 of frame 15. In one implementation, each end block 81 contains a set screw 83 to fix a shaft 85 in its place and prevent the shaft 85 from moving. Similarly, the truck 80 also includes two slide block assemblies 82 that can move (i.e., translate, slide) (as shown by arrows B) along the shaft 85, attached between each end block 81. In some implementations, the two slide block assemblies 82 can move towards each other or the two slide block assemblies 82 can move away from each other. In other implementations, the two slide block assemblies 82 can move in tandem. In other words, the two slide block assemblies 82 move together (or concurrently) in the same direction. It should be understood that the movement of the two slide block assemblies 82 works in conjunction with the bridge 40 disposed above. That is, the translational movements allow for the two slide block assemblies 82 to be directly below the bridge 40 that supports the hydrajacks 22, allowing for a precise and accurate displacement of the slide block assemblies 82. On top of each slide block assembly 82 includes the metal contact pad 98 for receiving the jacking screw 27 of the hydrajack 22. It should be appreciated that the metal contact pad 98 is configured as a wear-resistant surface to apply the downward force against thereof.

Figure 11A:
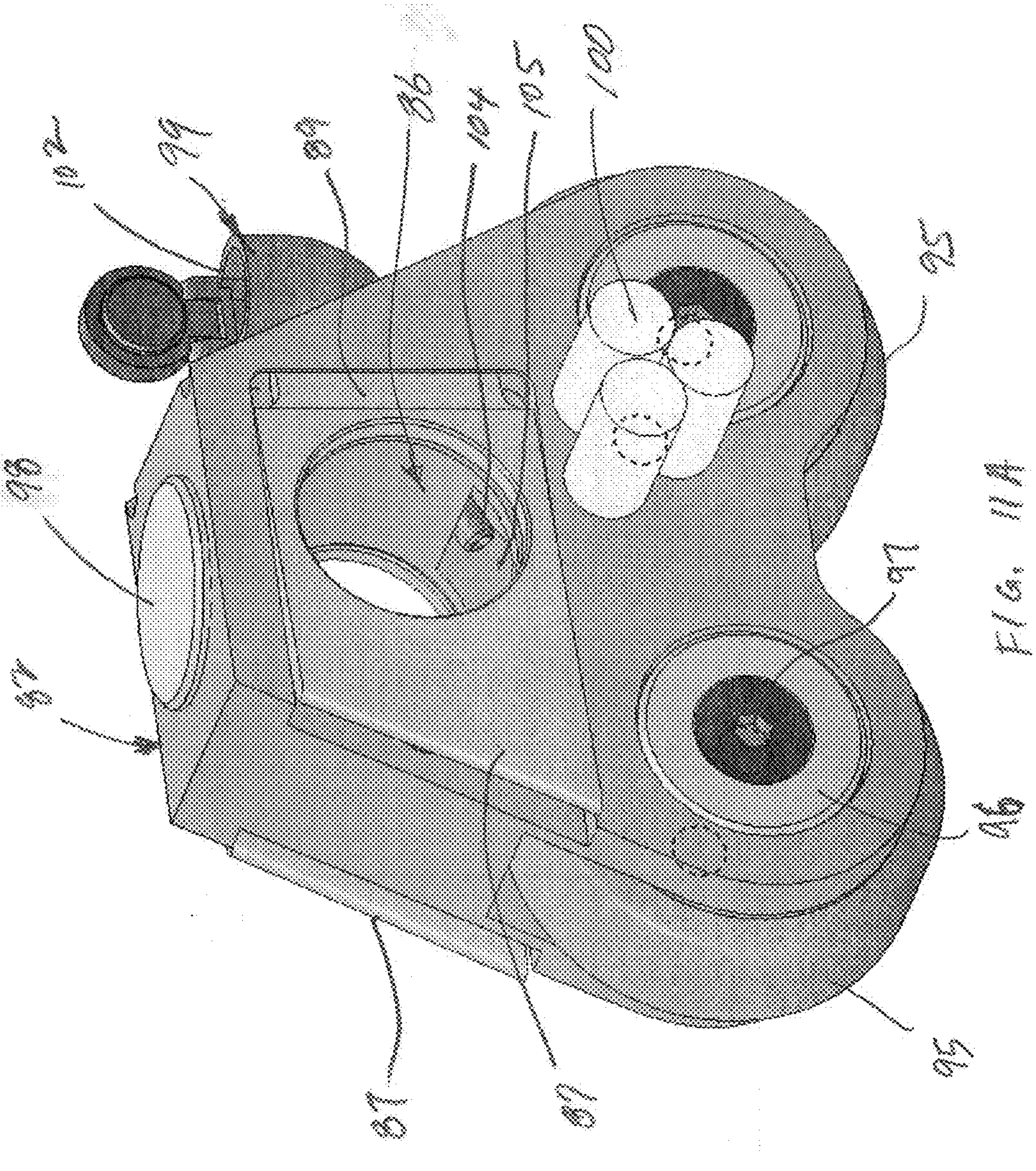
FIGS. 11A to 11D are perspective partial views of a slide block assembly, according to an example embodiment of the present disclosure.
Figure 11B:
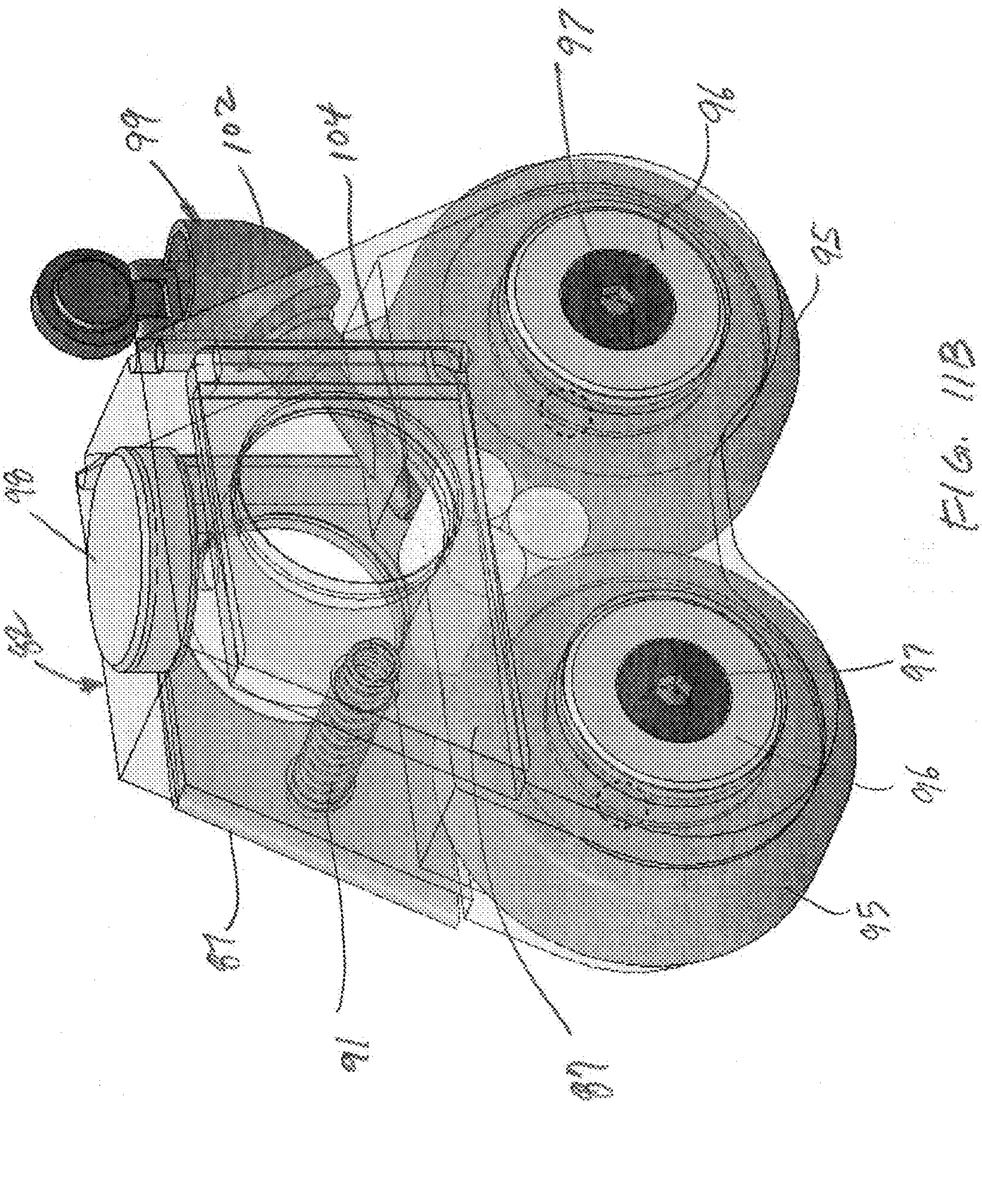
Figure 11C:
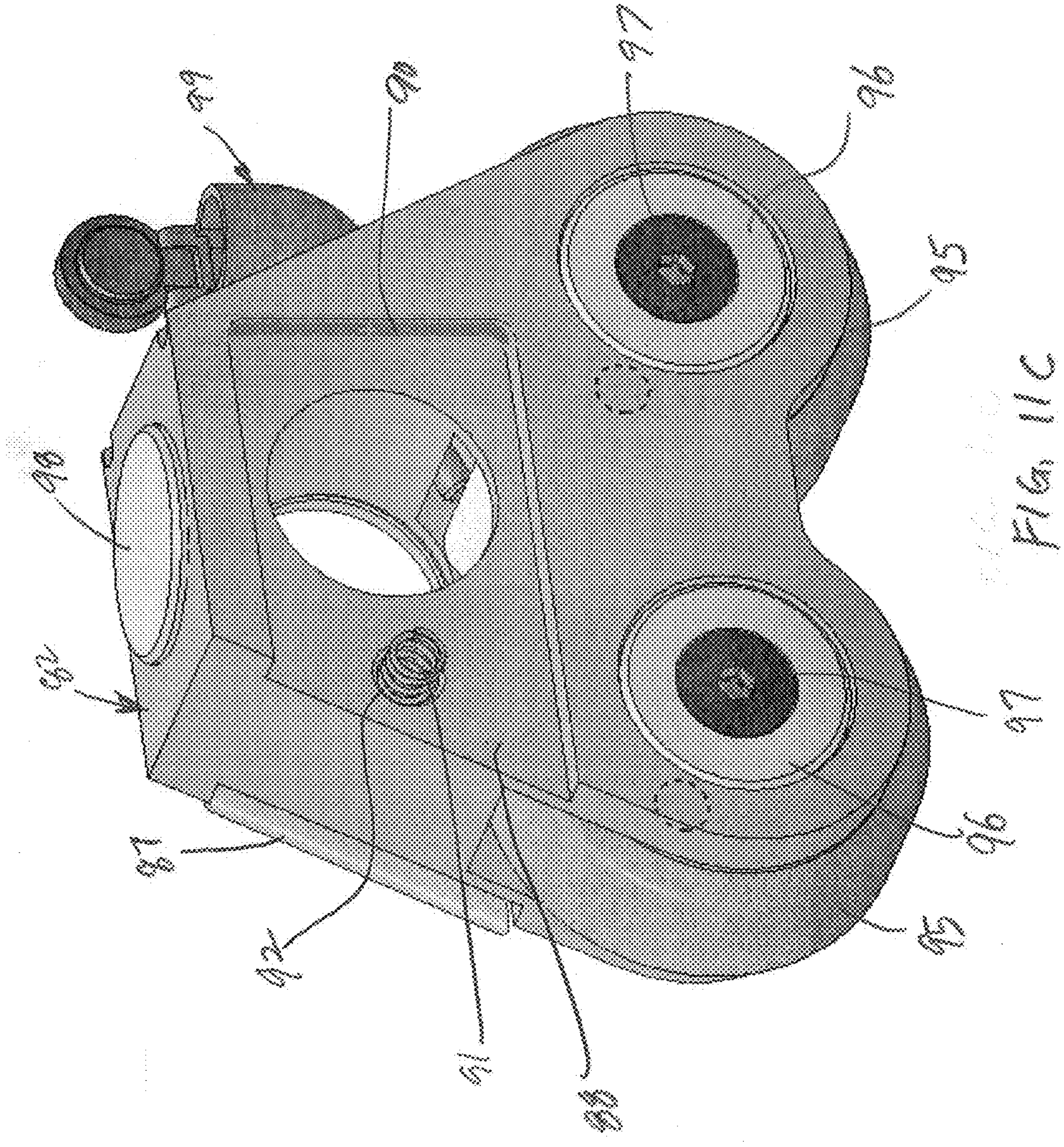

Referring to FIGS. 11A to 11C, the slide block assembly 82 includes an opening 86 corresponding to the shape of shaft 85. In some implementations, opening 86 has a substantially circular shape. It is appreciated that other shapes may be employed besides the shape described herein.

Figure 11D:
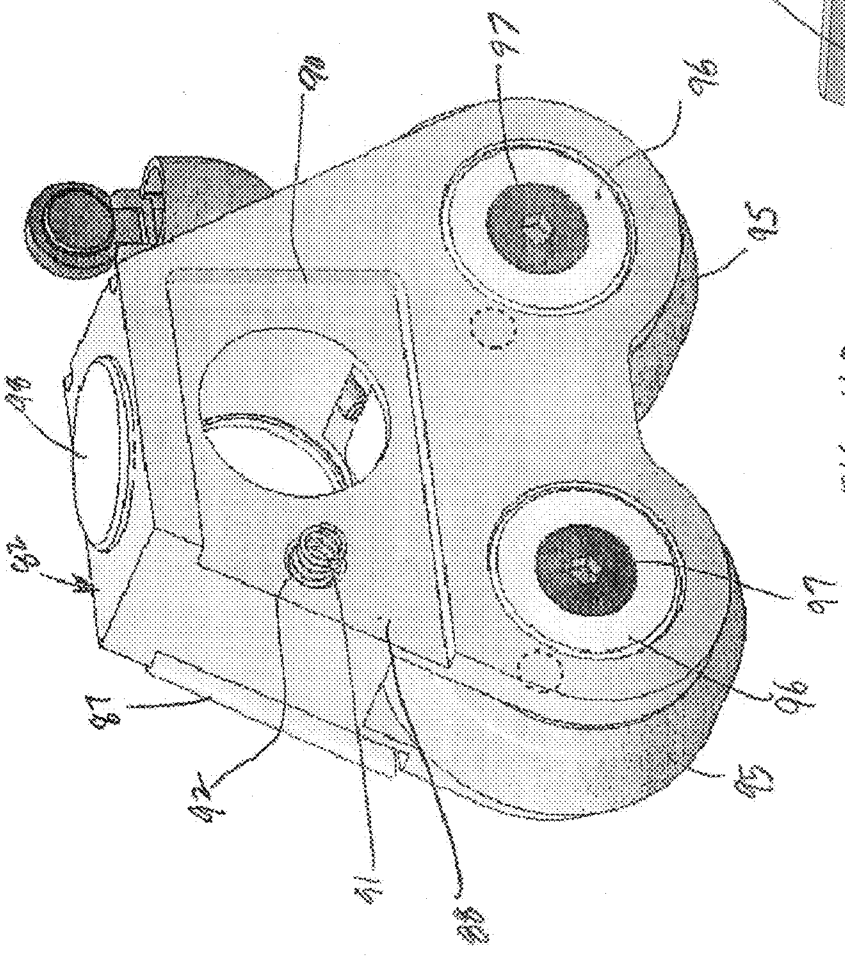
Figure 11E:
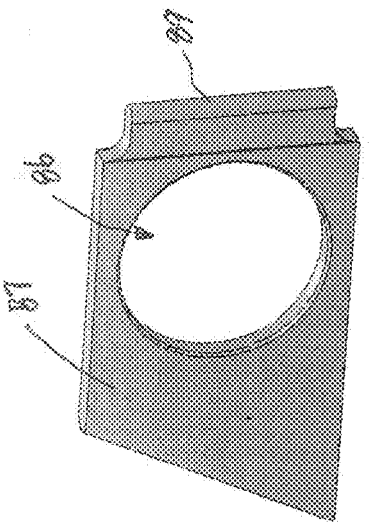
FIG. 11E is an exemplary brake leaf of a slide block assembly of a truck, according to an example embodiment of the present disclosure.

As similarly discussed above, in order to lock and release the slide block assembly 82 from shaft 85, the slide block assembly 82 includes a spring-loaded brake leaf 87 at each side portion 88 of the slide block assembly 82. One end 89 of the spring-loaded brake leaf 87 is attached (or inserted into) to a slot portion 90 (FIG. 11D) of the slide block assembly 82. In one implementation, end 89 is rounded or curved that is designed to intermate or engage with the slot portion 90 of the slide block assembly 82 (FIG. 11E). In other words, the brake leaf 87 can pivot about the rounded end 89 while being engaged inside the slot portion 90, in which the slot portion 90 is curved surface machined into the side portion 88 of the slide block assembly 82. Due to the shape and interaction of the rounded end 89 against the slot portion 90, the brake leaf 87 can be wedged which prevents from any movement until it is released. As shown in FIG. 11B, a coil spring 91 is attached to the brake leaves 87 at each end thereof and extends through an opening 92 formed in a body of the slide block assembly 82 (FIG. 11C). The coil spring 91 provides the resistance force to lock the brake leaves 87 in their place. In other words, a tension of the coil spring 91 provides an outward force that allows the brake leaves 87 to be fixed in its place. In order to release the brake leaves 87, the operator moves the brake leaves 87 toward each other (i.e., squeezes the brake leaves 87 together) causing the slide block assembly 82 to unlock and freely move or slide along shaft 85. Once the desired location is set, the operator then releases both brake leaves 87 and locks the slide block assembly 82 against the shaft 85. This enables an easy, quick adjustability of the block assemblies 82 without any tools or additional procedures.

In some implementations, each slide block assembly 82 includes two ball bearings 95 that are free to spin on a bearing pin 96. The bearing pin 96 is held against the slide block assembly 82 and fastened with a fastener 97, i.e., a screw, for example. In some implementations, the ball bearings 95 are lubricated so as extend the life of the ball bearings 95 as well as the rotary tooling in the press. In one implementation, the ball bearings 95 are lubricated via felt cords 100 that directly or indirectly contact the ball bearings 95. For example, the felt cords 100 are three short cut-offs that contact the ball bearings 95, where lubricant (e.g., oil) is contained in an oil cup assembly 99. It should be appreciated that there may be less than or more than a three-corded felt design. The oil cup assembly 99 includes a cup portion 102 for containing and receiving the lubricant and a tube 104 that distributes the oil to the felt cords 100. The tube 104 extends into a cut-out portion 105 formed in the body of the slide block assembly 82 near the opening 86 (FIGS. 11A and 11B).

Figure 12:
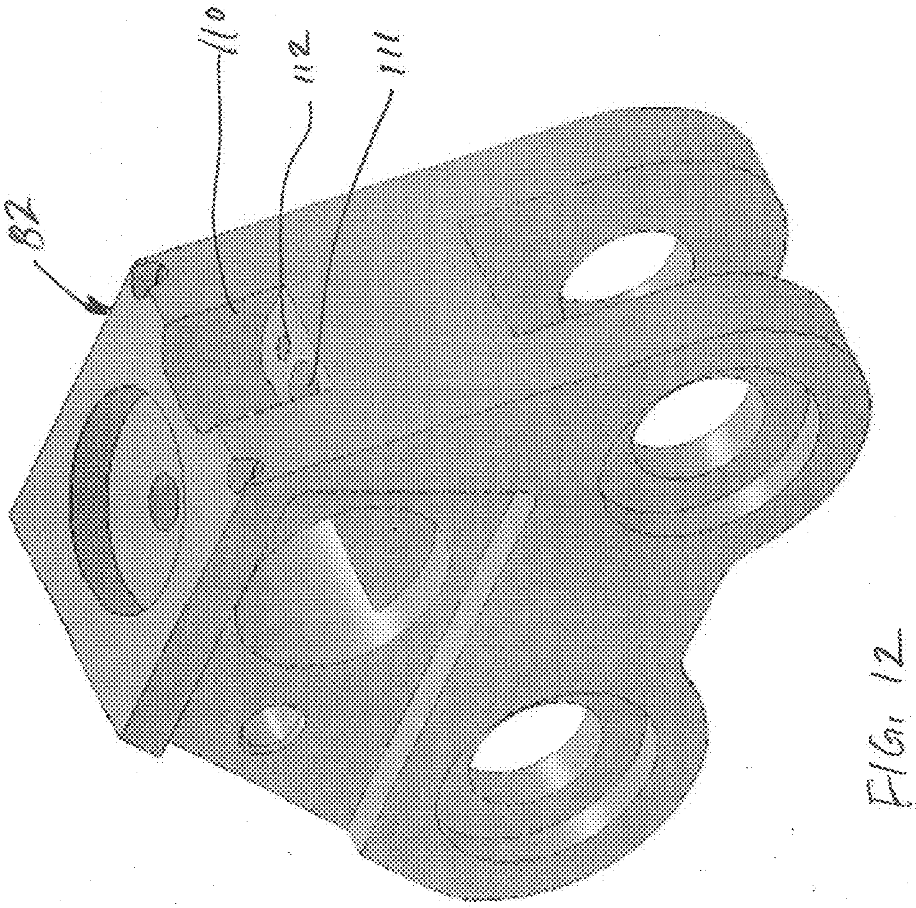
FIG. 12 is a perspective view of a slide block assembly, according to another example embodiment of the present disclosure.

In other configurations, the oil cup assembly 99 is not required to lubricate the felt cords 100. For example, as shown in FIG. 12, the oil cup assembly 99 is removed and replaced with features machined into the slide block assembly 82. In particular, a cut-out portion 110 is formed in the body of the slide block assembly 82 which contains two holes 111, 112 at a floor of the cut-out portion 110. In some implementation, hole 111 is larger than hole 112. In one implementation, lubricant may enter into larger hole 111 to distribute lubricant to the felt cords 100. In one implementation, larger hole 111 is formed inside of the body of the slide block assembly 82 at an (downward) angle (not shown) in a direction to transports the lubricant towards the felt cords 100. In some implementations, smaller hole 112 is configured to receive a screw to fasten a rotating sheet metal cover, for example.

In some implementations, the rotary system 10 can include a control unit (not shown) including a controller functionally coupled to a sensor(s) for determining the exact location of the block assemblies on the shaft bar for proper applied pressure against the rollers or dies. This ensures a precise and accurate pressure application of the rotary system. In other implementations, the sensor(s) can be used to determine at least one characteristic property of a material or product used to be treated of the rotary device. Such characteristic property could be type of material being treated, specific parts of the material being treated, thickness of a specific material, or specific tools required for changeover, such as, but not limited to, rotary dies, nip rollers, bridge and trucks, cables, hand tools, roll lift/crane, etc. In such a way, the sensor(s) can determine a type of profile of each material or product and transmit such data to the control unit which can operate the pressure (up to 1000 psi, for example) using information provided by the sensor(s). As such, it is possible to treat, via pressure, the materials, having individual and varying characteristics in the rotary device. In other implementations, sensor(s) can be a load cell sensor so as to sense misalignment or tolerance stackups that cause positional variation between the truck and the rollers or dies depending on the block assembly position along the bar shaft.

In other implementations, sensor(s), as controlled by the controller, can determine the type of material or product and applied pressure thereof subsequent to being directed to the press. Subsequently, a database of historical runs (stored in a storage, for example) corresponding with the same or similar material can be used to lookup what pressure was used to produce desirable results in the past. Moreover, the controller is adapted or configured to provide alerts/logging information and receive historical run data or updates to software or firmware from the storage or storage device such as cloud storage or the Internet of Things ("IoT") as is well known and not further discussed herein.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one," as used herein, means one or more and thus includes individual components as well as mixtures/combinations.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A rotary device, comprising:

a plurality of rollers;

a bridge attached to a frame of the rotary device; and a truck attached to the frame and disposed below the bridge and configured to support at least two block assemblies, the at least two block assemblies being configured to be moveable with respect to each other, the truck includes a shaft such that the at least two block assemblies slide on the shaft and locks in place at different locations along the shaft, wherein a downward force is applied against a top portion of the at least two block assemblies to apply pressure against a topmost roller of the plurality of rollers.

2. The rotary device of claim 1, wherein the bridge includes at least two block assemblies that are slideable along two shafts, wherein each end of the two shafts is attached to an end block.

3. The rotary device of claim 2, wherein each of the at least two block assemblies of the bridge includes a first opening and a second opening that are configured to slide on the respective two shafts.

4. The rotary device of claim 3, wherein the first opening has a first shape and the second opening has a second shape.

5. The rotary device of claim 4, wherein the first shape is different than the second shape.

6. The rotary device of claim 5, wherein the first shape is circular and the second shape is oval.

7. The rotary device of claim 2, wherein each of the at least two block assemblies of the bridge includes at least two elongated supports that engage with corresponding fasteners on the frame of the rotary device.

8. The rotary device of claim 7, wherein each end block of the bridge further comprises a lock pin assembly that is configured to allow the bridge to move and lock the bridge against the frame of the rotary device.

9. The rotary device of claim 8, wherein the lock pin assembly include a lock pin that is configured to rotate thereof, wherein the rotated lock pin releases and locks the bridge against the frame of the rotary device.

10. The rotary device of claim 9, wherein the lock pin assembly includes a magnet to cause a resisting torque force when rotating the lock pin.

11. The rotary device of claim 2, wherein each of the at least two block assemblies of the bridge includes a pair of pivotal brake leaves to lock and release the block assembly from sliding along the two shafts.

12. The rotary device of claim 11, wherein the pair of pivotal brake leaves is spring-loaded.

13. The rotary device of claim 1, wherein the downforce force is produced by a hydrajack that extends through the bridge and contacts a metal contact pad formed on the top portion of each of the at least two block assemblies of the truck.

14. The rotary device of claim 1, wherein each of the at least two block assemblies of the truck includes two ball bearings to apply constant direct pressure to the topmost roller.

15. The rotary device of claim 14, wherein the truck further comprises a cup containing lubricant to lubricate at least the two ball bearings.

16. The rotary device of claim 15, further comprising a felt material that contacts the two ball bearings, wherein the felt material is saturated with the lubricant so as to apply the lubricant to the two ball bearings.

17. The rotary device of claim 1, wherein each of the at least two block assemblies of the truck includes an opening that is configured to slide on the shaft of the truck.

18. The rotary device of claim 1, wherein each of the at least two block assemblies of the truck includes a pair of brake leaves to lock and release the block assembly from sliding along the shaft of the truck.

19. The rotary device of claim 18, wherein the pair of brake leaves is pivotal with respect to each other such that when the pair of brake leaves move toward each other, the block assembly is released and when the pair of brake leaves move away from each other, the block assembly is locked.

20. The rotary device of claim 18, wherein the pair of brake leaves is spring-loaded.

* * * * *